(12) United States Patent
Ishida et al.

(10) Patent No.: US 9,555,850 B2
(45) Date of Patent: Jan. 31, 2017

(54) SADDLE-TYPE VEHICLE

(71) Applicant: HONDA MOTOR CO., LTD., Tokyo (JP)

(72) Inventors: Shinichiro Ishida, Wako (JP); Masao Akieda, Wako (JP); Jun Fujii, Wako (JP); Toshiaki Nakao, Wako (JP); Katsumasa Mukai, Wako (JP); Kenjiro Iwasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/475,010

(22) Filed: Sep. 2, 2014

(65) Prior Publication Data

US 2016/0200391 A1 Jul. 14, 2016

(30) Foreign Application Priority Data

Sep. 11, 2013 (JP) ................................ 2013-188827

(51) Int. Cl.
*B62K 11/04* (2006.01)
*B62K 25/28* (2006.01)

(52) U.S. Cl.
CPC ............. *B62K 11/04* (2013.01); *B62K 25/283* (2013.01); *B62K 25/286* (2013.01)

(58) Field of Classification Search
CPC ............................ B62K 25/283; B62K 11/04
USPC ....................................................... 180/219
See application file for complete search history.

(56) References Cited

U.S. PATENT DOCUMENTS

| | | | | |
|---|---|---|---|---|
| 4,671,375 A * | 6/1987 | Oike | .................... | B62K 25/283 180/227 |
| 6,024,185 A * | 2/2000 | Okada | .................... | B62K 11/04 180/227 |
| 6,186,550 B1 * | 2/2001 | Horii | ...................... | B62D 21/16 180/225 |
| 6,450,282 B1 * | 9/2002 | Gogo | .................... | B62K 25/28 180/219 |
| 7,267,193 B2 * | 9/2007 | Nagashii | ................ | B62K 11/04 180/219 |
| 7,490,689 B2 * | 2/2009 | Seki | ........................ | B62K 11/04 180/229 |
| 7,527,119 B2 * | 5/2009 | Iizuka | .................... | B62K 25/20 180/227 |
| 7,650,955 B2 * | 1/2010 | Hasegawa | ............ | B62K 25/283 180/227 |
| 7,669,680 B2 * | 3/2010 | Hasegawa | ............. | B60T 8/3685 180/219 |
| 7,712,756 B2 * | 5/2010 | Seki | ........................ | F16F 9/145 180/219 |

(Continued)

FOREIGN PATENT DOCUMENTS

JP 2007-091113 A 4/2007

*Primary Examiner* — Tony Winner
*Assistant Examiner* — Michael Stabley
(74) *Attorney, Agent, or Firm* — Squire Patton Boggs (US) LLP

(57) ABSTRACT

In a saddle-type vehicle, an engine is supported by a pivot shaft through insertion of the pivot shaft into a bracket part provided at a rear part of the engine. A center lower cross frame is so provided as to span a space between parts in left and right pivot plates on the lower side relative to the pivot shaft. The pivot shaft and the center lower cross frame are connected by a hanger member.

18 Claims, 10 Drawing Sheets

(56) References Cited

U.S. PATENT DOCUMENTS

| | | | | |
|---|---|---|---|---|
| 8,215,438 B2* | 7/2012 | Ito | ............................ | B62M 17/00 |
| | | | | 180/226 |
| 2011/0030647 A1* | 2/2011 | Kataoka | ................... | F02F 1/102 |
| | | | | 123/195 R |
| 2012/0274057 A1* | 11/2012 | Kanai | ....................... | B62J 35/00 |
| | | | | 280/835 |
| 2013/0182743 A1* | 7/2013 | Nishi | ........................ | G01K 1/14 |
| | | | | 374/144 |

* cited by examiner

SADDLE-TYPE VEHICLE

BACKGROUND

Field

The present invention relates to a saddle-type vehicle.

Description of the Related Art

A saddle-type vehicle, such as a motorcycle, in which an engine is supported by a cross pipe forming the vehicle body frame is conventionally known, for example in Japanese Patent Laid-Open No. 2007-91113 (Patent Document 1).

In the motorcycle relating to Patent Document 1, a tubular member into which a bolt is inserted is provided on the cross pipe and the bolt inserted into the tubular member from a rear side along the front-rear direction is fastened directly to a rear part of the crankcase of the engine.

In this motorcycle relating to Patent Document 1, the crankcase is tightly fixed to the cross pipe of the vehicle body frame. Therefore, the engine functions as a reinforcing member of the vehicle body frame and a chain reaction force generated when the engine is driven and a road surface reaction force generated in traveling are efficiently transmitted to the vehicle body frame and the engine. Thus, rigidity against these forces can be favorably ensured.

In the structure of the motorcycle relating to the above-described Patent Document 1, the rigidity of the vehicle body frame can be favorably ensured by the engine. However, in some cases, this structure is not necessarily favorable for a vehicle desired to ensure a certain level of flexibility in the vehicle body frame to ensure favorable vehicle control performance.

Specifically, in the case of a vehicle intended to travel on dirt roads or a vehicle intended to travel on both dirt roads and public roads (on-off category), ensuring the vehicle control performance is often desired more than ensuring the rigidity of the vehicle body frame. In such a vehicle, the structure relating to the above-described Patent Document 1 is not necessarily favorable in some cases.

However, if the rigidity of the vehicle body frame is lowered, concerns arise in ensuring the rigidity against the chain reaction force generated when the engine is driven and the road surface reaction force generated in traveling.

Therefore, it is desired to ensure the rigidity by allowing the chain reaction force and the road surface reaction force to be efficiently transmitted to a component like the vehicle body frame for which rigidity is ensured in a vehicle meeting demands that the vehicle control performance can be ensured with ensuing of adequate rigidity of the vehicle body frame.

SUMMARY

Therefore, embodiments of the present invention are intended to provide a saddle-type vehicle that can ensure the vehicle control performance with ensuring of adequate rigidity of the vehicle body frame and can efficiently transmit external forces such as the road surface reaction force generated in traveling to the vehicle body frame.

As means to solve the above-described problem, embodiments of the present provide a saddle-type vehicle including a vehicle body frame having a pair of left and right main frames extending rearward from a head pipe. A pair of left and right pivot plates extend downward from rear parts of the left and right main frames, and a pair of left and right lower frames extend along front-rear direction at a lower part of the vehicle and each have a rear end part connected to a respective one of the left and right pivot plates. The saddle-type vehicle can further include a swing arm supported swingably around a pivot shaft that is so provided as to span a space between the left and right pivot plates, a rear wheel supported by the swing arm, and an engine supported by the vehicle body frame. The engine is supported by the pivot shaft through insertion of the pivot shaft into a bracket part provided at a rear part of the engine. A cross frame is so provided as to span a space between parts in the left and right pivot plates on the lower side relative to the pivot shaft or between rear parts of the left and right lower frames. The pivot shaft and the cross frame are connected by a hanger member.

In certain embodiments, the swing arm includes a left arm part connected to the pivot shaft on a left side relative to center in vehicle width direction and a right arm part connected to the pivot shaft on a right side relative to the center in the vehicle width direction. The bracket part is connected to the pivot shaft between the left arm part and the right arm part. The hanger member is connected to the pivot shaft between the left arm part and the right arm part.

In certain embodiments, the hanger member is formed into a substantially U-shape having a left extending part, a right extending part, and a bottom part that connects one end part of the left extending part and one end part of the right extending part, and is so disposed as to be opened upward in front view. Pivot shaft attaching holes into which the pivot shaft is inserted are formed at upper end parts of the left extending part and the right extending part. The left extending part and the right extending part are connected to the pivot shaft through insertion of the pivot shaft into the pivot shaft attaching holes between the left arm part and the right arm part.

In certain embodiments, the bottom part is fastened to a fastening part provided at a center part of the cross frame in the vehicle width direction from an upper side toward the lower side by a fastening member.

In certain embodiments, the bottom part is disposed at a position overlapping with the cross frame in the upward-downward direction and is fastened to the fastening part with intermediary of an elastic member.

In certain embodiments, insertion holes for fastening members fastened to the engine are each formed at an intermediate part between an upper end part and a lower end part of a respective one of the left extending part and the right extending part. Rotation of the hanger member around the pivot shaft is restricted by fastening of the fastening members inserted into the insertion holes to the engine.

In certain embodiments, an interval between the insertion holes on the left and right sides is different from an interval between the pivot shaft attaching holes on the left and right sides and the insertion holes on the left and right sides are located inside the pivot shaft attaching holes on the left and right sides in the vehicle width direction.

In certain embodiments, the hanger member completely overlaps with the pivot plates in side view.

In certain embodiments, the pivot shaft and the cross frame are disposed at positions overlapping with each other in upward-downward direction.

In certain embodiments, a drive chain that is wound around a transmitting gear of the engine and a transmitting gear of the rear wheel and transmits a driving force of the engine to the rear wheel.

In certain embodiments, a link mechanism unit that is so provided as to span a space between the swing arm and the cross frame and the link mechanism unit and the vehicle body frame are connected by a rear cushion.

Due to the connection of the pivot shaft and the cross frame by the hanger member, when the vehicle body frame is about to bend in a roll direction, the hanger member generates a restoring force in the opposite direction to the direction in which the vehicle body frame is about to bend. Due to this, the rigidity in the roll direction is ensured. However, the vehicle body frame is deformed in the roll direction more easily compared with the case in which the engine is fastened directly to the cross frame. This ensures the vehicle control performance with ensuring of adequate rigidity of the vehicle body frame.

Furthermore, the road surface reaction force generated in traveling is transmitted from the pivot shaft and the cross frame to the vehicle body frame via the hanger member in a dispersed manner.

Due to this, the vehicle control performance is ensure with ensuring of adequate rigidity of the vehicle body frame and external forces such as the road surface reaction force generated in traveling can be efficiently transmitted to the vehicle body frame.

Moreover, the engine driving force is transmitted from the pivot shaft and the cross frame toward the front side. Thus, the engine driving force can be transmitted from the side of the vehicle body lower part to the vehicle body side. Therefore, it is also possible to efficiently transmit the engine driving force to the vehicle body side.

In certain embodiments, the vehicle control performance can be ensured more favorably compared with the case in which the hanger member is greatly separate to either the left or right side.

In certain embodiments, the swing arm and the hanger member can be collectively supported by the pivot shaft and thus the hanger member can be provided without increasing the number of parts. Furthermore, because the hanger member is formed into a substantially U-shape and is connected to the pivot shaft in such a state as to be opened upward in front view, a load in the upward-downward direction transmitted to the hanger member can be dispersed into the left and right parts and absorbed at the left and right parts. In addition, the hanger member gives rigidity in the roll direction by the left and right parts evenly and therefore the vehicle control performance can be favorably ensured.

In certain embodiments, the bottom part of the hanger member is fastened to the fastening part at one point located at the center part of the cross frame in the vehicle width direction from the upper side toward the lower side by the fastening member. This facilitates assembling of the hanger member.

In certain embodiments, the fastening of the bottom part to the cross frame with the intermediary of the elastic member allows the vehicle body frame to be adequately bent in the roll direction. Thus, the vehicle control performance can be favorably ensured.

Furthermore, because the bottom part is so disposed as to overlap with the cross frame in the upward-downward direction, a load can be efficiently transmitted from the bottom part of the hanger member to the cross frame and the rigidity against external forces (input load) can be favorably ensured.

In certain embodiments, the rotation of the hanger member is restricted. This allows stable transmission of a load from the hanger member to the cross frame.

If a rear part shape of the engine is tapered toward the lower side, the hanger member can be provided with a compact size with suppression of outward extension thereof in the vehicle width direction.

In certain embodiments, the hanger member is hidden by the pivot plates in side view, which can make the appearance favorable.

In certain embodiments, the hanger member extends straight or substantially straight along the upward-downward direction and thus is not parallel to the traveling surface. Furthermore, a load can be supported by the pivot shaft and the cross frame in a dispersed manner, which can suppress the concentration of the load on the pivot shaft.

In the saddle-type vehicle of a chain-driven system, the chain reaction force is dispersed from the pivot shaft and the cross frame to the vehicle body frame via the hanger member. Thus, the chain reaction force can be efficiently transmitted to the vehicle body frame.

In certain embodiments, the hanger member can efficiently disperse the force of pulling of the cross frame by the link mechanism unit due to generation of the road surface reaction force into the cross frame and the pivot shaft.

DETAILED DESCRIPTION

Figure 1:
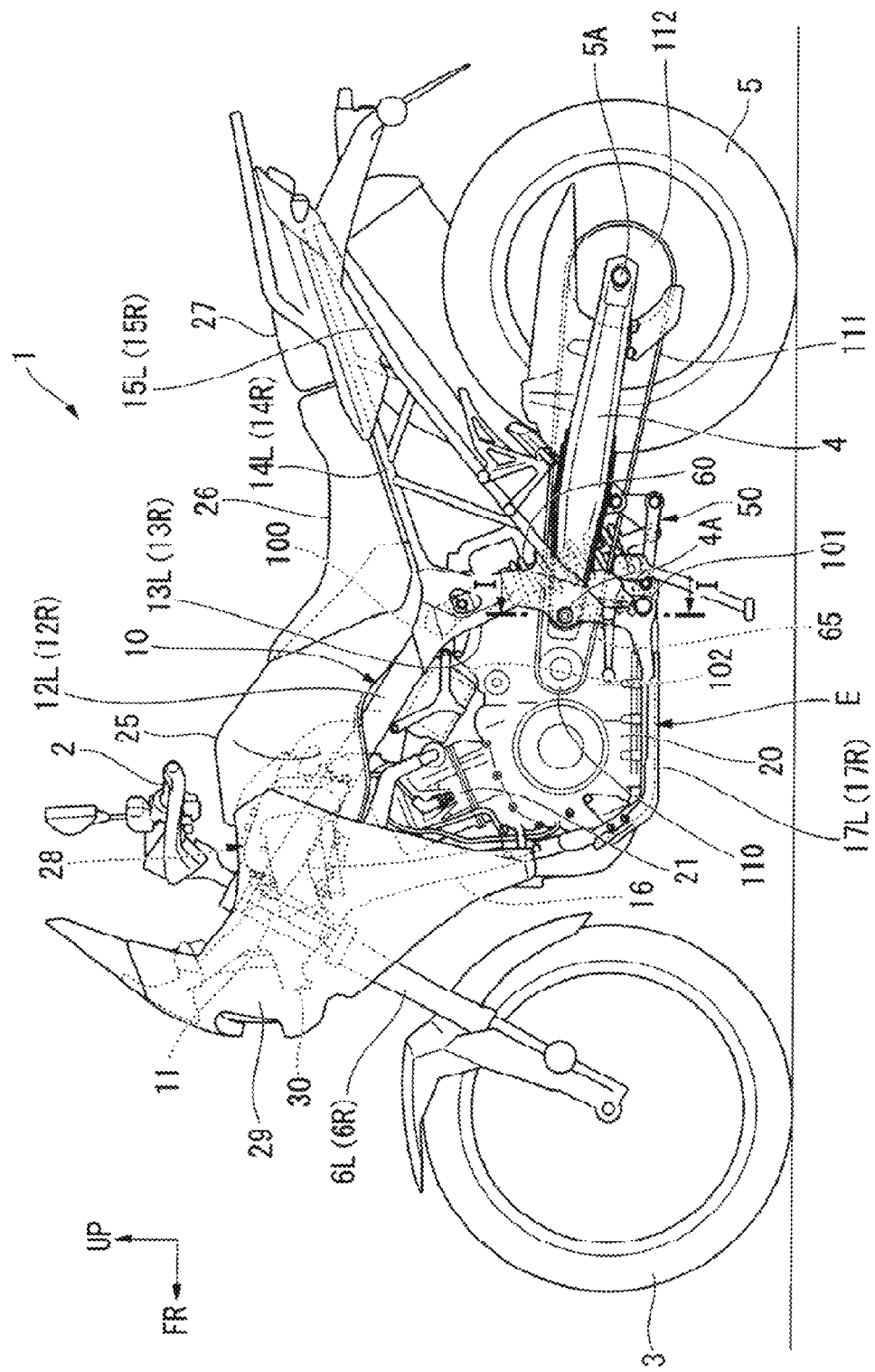
FIG. 1 is a left side view of a motorcycle according to embodiments of the present invention.

Embodiments of the present invention will be described below with use of the drawings. In the drawings used for the following description, an arrow FR, an arrow UP, and an arrow LH indicate the front side, upper side, and left side, respectively, of the vehicle.

In FIG. 1, a left side view of a motorcycle 1 as a saddle-type vehicle according to certain embodiments is shown. In the motorcycle 1, an engine E is disposed between a front wheel 3 steered by a steering handlebar 2 and a rear wheel 5 disposed at a rear end part of a swing arm 4. Steering-system parts including the steering handlebar 2 and the front wheel 3 are pivotally supported by a head pipe 11 at a front end of a vehicle body frame 10 steerably. The swing arm 4 is swingably supported at its front end part by the vehicle body frame 10 and supports an axle 5A of the rear wheel 5 by its rear end part.

Figure 2:
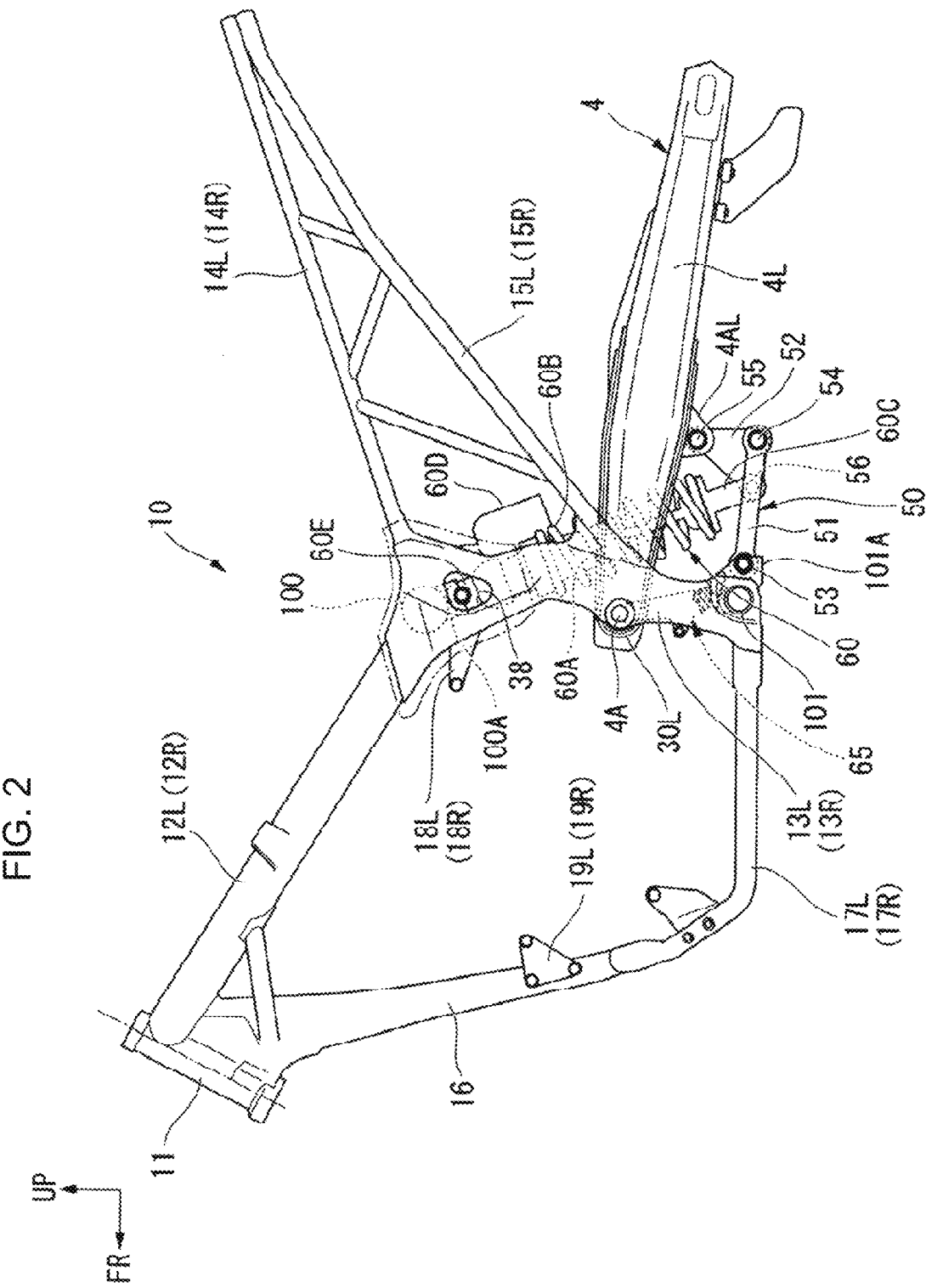
FIG. 2 is a left side view of a vehicle body frame of the motorcycle and a swing arm connected to this vehicle body frame.
Figure 3:
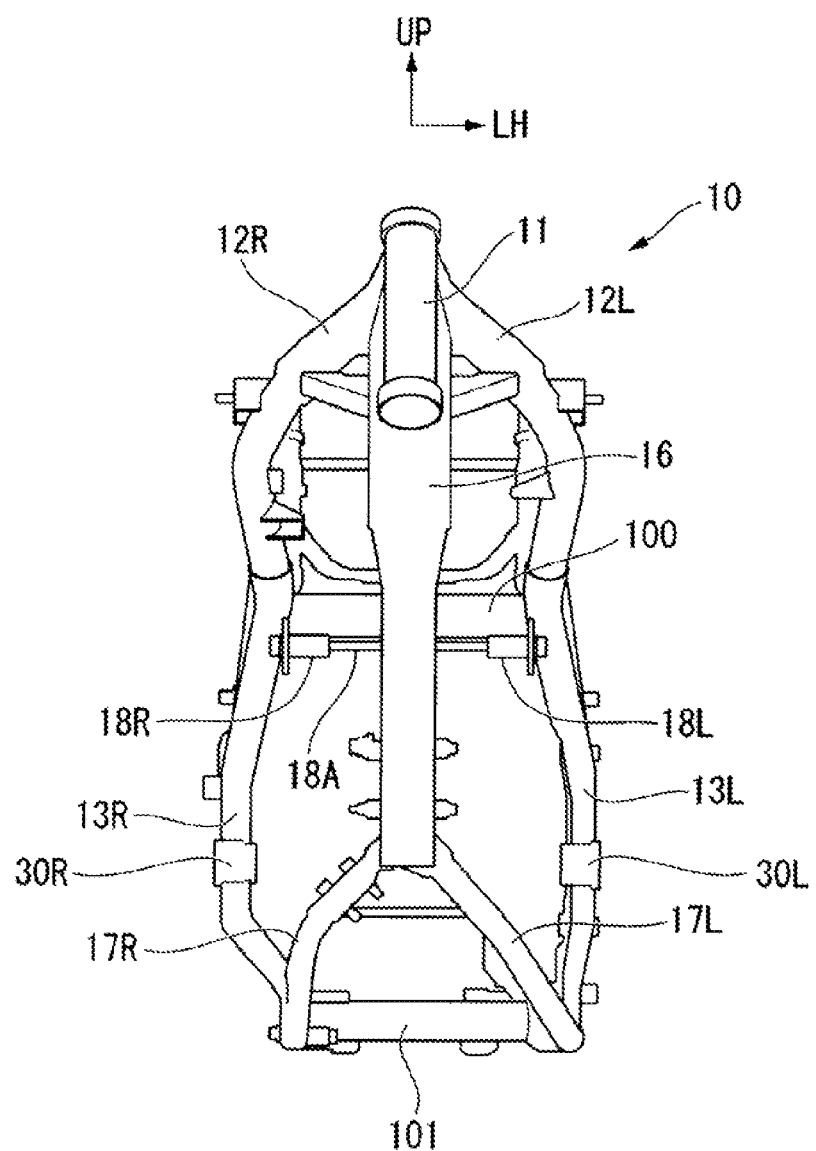
FIG. 3 is a front view of the vehicle body frame.

Referring also to FIGS. 2 and 3, the vehicle body frame 10 is formed by making plural frame members monolithic by welding or the like. The vehicle body frame 10 the above-described head pipe 11, a pair of left and right main frames 12L and 12R that arise from branching from the head pipe 11 into left and right parts and extend rearward and downward, a pair of left and right pivot plates 13L and 13R that are each connected to a rear end part of a respective one of the left and right main frames 12L and 12R and extend downward, a pair of left and right seat rails 14L and 14R that are each connected to an upper part of a respective one of the left and right pivot plates 13L and 13R and extend rearward and upward, and a pair of left and right sub-frames 15L and 15R that are each connected to a respective one of the left and right pivot plates 13L and 13R and extend rearward and upward below the left and right seat rails 14L and 14R, with a rear end part of each of the sub-frames 15L and 15R connected to a corresponding one of the left and right seat rails 14L and 14R.

Furthermore, the vehicle body frame 10 includes one down frame 16 extending from the head pipe 11 rearward and downward at a steeper angle than the main frames 12L and 12R, and a pair of left and right lower frames 17L and 17R that arise from branching from a lower end part of the down frame 16 into left and right parts and extend rearward, with a rear end part of each of the lower frames 17L and 17R connected to a lower end part of a corresponding one of the left and right pivot plates 13L and 13R. In the vehicle body frame 10, the main frames 12L and 12R, the seat rails 14L and 14R, and the pivot plates 13L and 13R are so connected as to form a Y-shape in side view.

Components that are not shown in the drawings are given symbols in parentheses in some cases for convenience of explanation.

The vehicle body frame 10 is formed as a semi-double-cradle frame in which the engine E is disposed below the main frames 12L and 12R and in front of the pivot plates 13L and 13R and is surrounded from the front side and the lower side by the down frame 16 and the lower frames 17L and 17R.

Referring to FIG. 2, the left and right pivot plates 13L and 13R are provided with rear engine support parts 18L and 18R, respectively, protruding forward as a pair of left and right parts. In addition, front engine support parts 19L and 19R protruding rearward are provided at the lower end part of the down frame 16 as a pair of left and right parts. The engine E is supported by the respective engine support parts.

Specifically, as shown in FIG. 3, a shaft member 18A is so provided as to span a space between the left and right rear engine support parts 18L and 18R and a rear part of the engine E is supported by this shaft member 18A. Furthermore, a shaft member (not shown) is so provided as to span a space between the left and right front engine support parts 19L and 19R and a front part of the engine E is supported by this shaft member.

The engine E can be supported also by a pivot shaft 4A. Details of this will be described later.

In each of the pair of left and right main frames 12L and 12R, the pair of left and right pivot plates 13L and 13R, the pair of left and right seat rails 14L and 14R, the pair of left and right sub-frames 15L and 15R, and the pair of left and right lower frames 17L and 17R, the left component is disposed on the left side relative to the center in the vehicle width direction and the right component is disposed on the right side relative to the center in the vehicle width direction. The left and right components of the respective frames, which are formed of these pairs of left and right components, are joined to each other by cross frames at appropriate positions.

Referring to FIG. 3, a center upper cross frame 100 is so provided as to span a space between the upper parts of the left and right pivot plates 13L and 13R and a center lower cross frame 101 is so provided as to span a space between the lower parts of the left and right pivot plates 13L and 13R.

The left and right end parts of the center upper cross frame 100 are welded to inner surfaces facing the inside in the vehicle width direction in the left and right pivot plates 13L and 13R. The left and right pivot plates 13L and 13R are formed into a plate shape that is wide in the front-rear direction. According to certain embodiments, the center upper cross frame 100 is located inside the left and right pivot plates 13L and 13R in the vehicle width direction and completely overlaps with the left and right pivot plates 13L and 13R to be invisible in both left side view and right side view.

The left and right end parts of the center lower cross frame 101 are made to penetrate the left and right pivot plates 13L and 13R and an outer circumferences of the penetrating parts are welded. The pivot shaft 4A and the center lower cross frame 101 are disposed at positions overlapping with each other in the upward-downward direction.

Besides these center upper cross frame 100 and center lower cross frame 101, a cross frame connecting the seat rails 14L and 14R is provided although detailed description thereof is omitted.

The engine E includes a crankcase 20 in which a crankshaft and a transmission are integrally housed and cylinders 21 protruding upward (to be exact, toward the front upper side) from the front side of the upper surface of the crankcase 20. They are so joined to form a V-shape in side view.

The engine E is so disposed that the crankcase and the cylinders 21 are housed in the space surrounded by the main frames 12L and 12R, the pivot plates 13L and 13R, the down frame 16, and the lower frames 17L and 17R.

The cylinder axis direction (protrusion direction) of the cylinders 21 is made to be substantially along the extension direction of the down frame 16. The engine E is a parallel two-cylinder engine and two cylinders lined in the left-right direction are formed as the cylinders 21.

In FIG. 1, symbol 110 denotes a drive sprocket provided at a position at a rear part in a left side part of the crankcase 20 and in front of the pivot shaft 4A. The drive sprocket 110 is fixed to an output shaft (not shown). Symbol 111 denotes a drive chain wound around the drive sprocket 110 and a driven sprocket 112 provided integrally with the rear wheel 5 at a center of the rear wheel 5.

The drive chain 111 transmits a driving force of the engine E to the rear wheel 5. The drive chain 111 is so located as to surround the pivot shaft 4A and the swing arm 4 in side view.

The steering-system parts supported by the above-described head pipe 11 have the front wheel 3, a pair of left and right front forks 6L and 6R that support the front wheel 3 at their lower parts, and the above-described steering handlebar 2 provided on upper end part side of the front forks 6L and 6R.

The swing arm 4 is connected to the pair of left and right pivot plates 13L and 13R by the pivot shaft 4A provided at a substantially center part in the upward-downward direction in the pair of left and right pivot plates 13L and 13R of the vehicle body frame 10. The pivot shaft 4A is so provided as to span a space between the pair of left and right pivot plates 13L and 13R and the swing arm 4 can swing in the upward-downward direction around the shaft in the left-right direction.

A fuel tank 25 is supported on the main frames 12L and 12R. Behind the fuel tank 25, a driver seat 26 is supported at a front upper part of the seat rails 14L and 14R and a passenger seat 27 is supported at a rear upper part of the seat rails 14L and 14R. The sitting parts in the driver seat 26 and the passenger seat 27 extend along the seat rails 14L and 14R.

An air cleaner 28 is disposed between the head pipe 11 and the fuel tank 25 and above the cylinders 21 of the engine E. A depressed recess (not shown) is rearwardly formed at a front part of the fuel tank 25 and part of the air cleaner 28 is housed in above-described recess.

Around the head pipe 11, a front cowl 29 is provided that extends over the front side and left and right sides (outside in the vehicle width direction) of the head pipe 11 and covers the head pipe 11 from the front side and left and right sides. The front cowl 29 covers the front part of the fuel tank 25 from the left and right sides and covers the air cleaner 28 from the left and right sides. The inner wall of the front cowl 29 is fixed to a front cowl stay 30 disposed in front of the head pipe 11. Therefore, the front cowl 29 is supported by the vehicle body side.

In side view, a space opened toward the outside in the vehicle width direction is formed inside the cylinders 21, the main frames 12L and 12R, the pivot plates 13L and 13R, and the crankcase 20. In this space, a battery 102 having a rectangular parallelepiped shape as its appearance shape is disposed.

Figure 4:
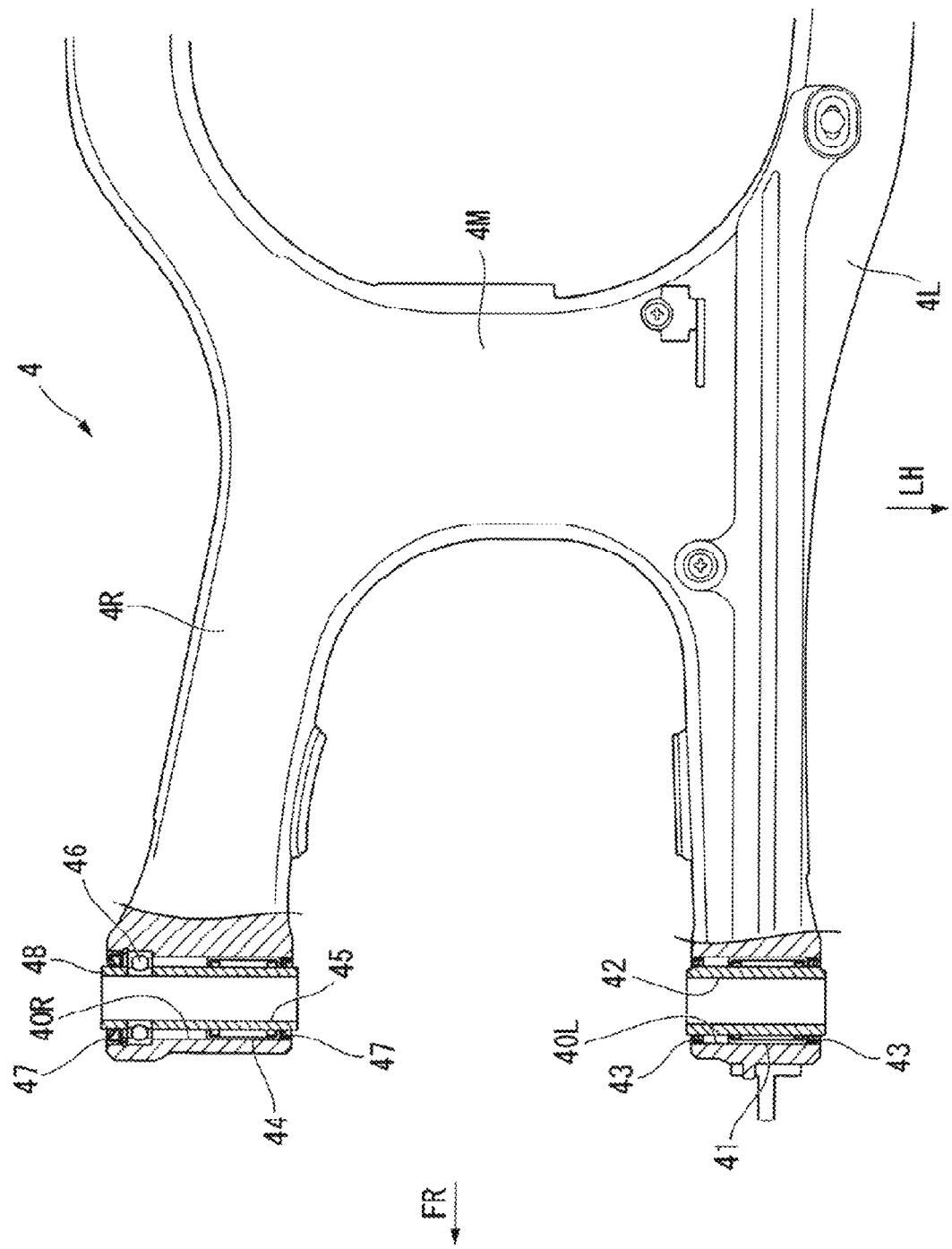
FIG. 4 is a top view of the swing arm.

With reference to FIGS. 2 and 4, the above-described swing arm 4 and the connection form thereof will be described in detail. The swing arm 4 in certain embodiments is composed of a left arm part 4L and a right arm part 4R extending along the front-rear direction and a connecting part 4M that connects these left arm part 4L and right arm part 4R at a substantially center part in the front-rear direction (to be exact, at a part on the front side relative to the center in the front-rear direction) in the left arm part 4L and the right arm part 4R.

The swing arm 4 is formed of an aluminum alloy and is formed by casting. The left arm part 4L, the right arm part 4R, and the connecting part 4M are monolithically molded. Although diagrammatic representation of rear parts of the left arm part 4L and the right arm part 4R is omitted in FIG. 4, the swing arm 4 supports the rear wheel 5 by rear end parts of the left arm part 4L and the right arm part 4R.

In FIG. 4, front end parts of the left arm part 4L and the right arm part 4R are shown by sections for convenience of description. Insertion holes 40L and 40R into which the pivot shaft 4A is inserted relatively rotatably are formed at the front end parts of the left arm part 4L and the right arm part 4R, respectively.

Figure 5:
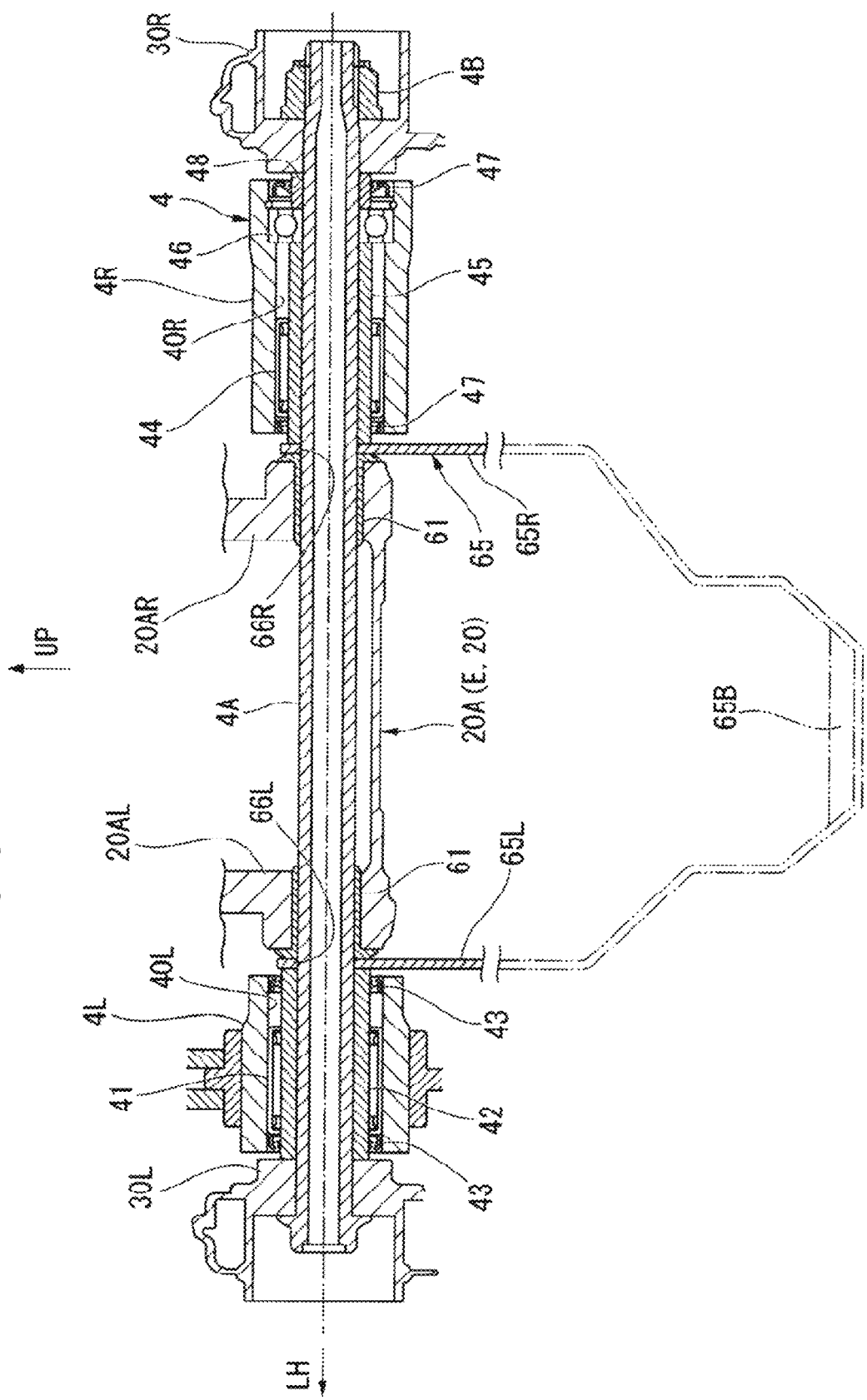
FIG. 5 is a sectional view along line I-I in FIG. 1.

In FIG. 5, a state in which the swing arm 4 is connected to the pivot plates 13L and 13R via the pivot shaft 4A is shown. Referring to FIGS. 3 and 5, left and right boss parts 30L and 30R with a cylindrical shape having hole parts penetrating in the left-right direction are formed monolithically with the left and right pivot plates 13L and 13R by welding at front edge parts of substantially center parts in the upward-downward direction in the pivot plates 13L and 13R, respectively.

For the swing arm 4, the pivot shaft 4A is so provided as to span a space between the left and right boss parts 30L and 30R in a state in which the insertion holes 40L and 40R of the left arm part 4L and the right arm part 4R are disposed coaxially with the boss parts 30L and 30R, respectively. Therefore, the left arm part 4L and the right arm part 4R are connected to the pivot plates 13L and 13R.

As shown in FIGS. 4 and 5, inside the insertion hole 40L of the left arm part 4L, a needle bearing 41 and a collar 42 that is disposed inside it and is made of a resin are provided. The left arm part 4L is rotatably supported by the pivot shaft 4A with the intermediary of the needle bearing 41 and the collar 42. A seal member 43 having a circular ring shape is provided at each of left and right end parts of the insertion hole 40L.

Inside the insertion hole 40R of the right arm part 4R, a needle bearing 44, a collar 45 that is disposed inside it and is made of a resin, and a ball bearing 46 are provided. The needle bearing 44 and the collar 45 are disposed on the left side relative to the ball bearing 46 and the inner ring of the ball bearing 46 abuts against the collar 45. A seal member 47 having a circular ring shape is provided at each of the left and right end parts of the insertion hole 40R and a collar 48 is provided inside the right seal member 47.

Figure 6:
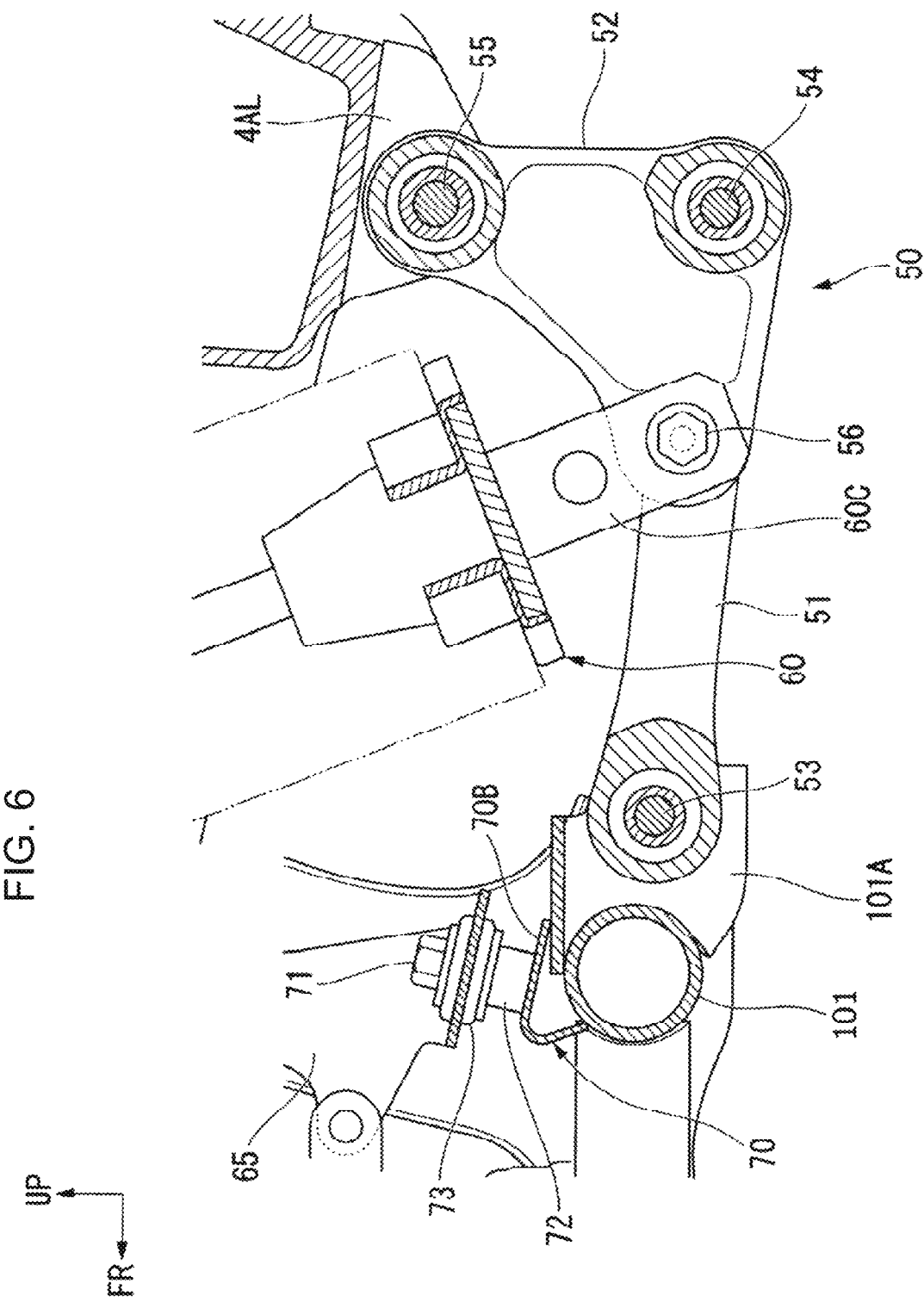
FIG. 6 is a longitudinal sectional view of a hanger member, a link mechanism unit, and a rear cushion included in the motorcycle along the front-rear direction.

As shown in FIG. 2, in certain embodiments, a link mechanism unit 50 is so provided as to span a space between the pivot plates 13L and 13R and the swing arm 4. FIG. 6 shows a longitudinal sectional view of the link mechanism unit 50 along the front-rear direction on the slightly left side relative to the center in the vehicle width direction.

Referring to FIGS. 2 and 6, the link mechanism unit 50 includes a first link member 51 and a second link member 52. The first link member 51 extends rearward and its front end part is rotatably connected to a frame-side link bracket 101A provided at the center in the vehicle width direction at a rear part of the center lower cross frame 101. The second link member 52 is formed into a triangular shape and one of its three corner parts is rotatably connected to a rear end of the first link member 51.

The first link member 51 is formed into a U-shape and is so disposed that the open part of the U-shape faces the rear side in top view. Into its front part, a first link pin 53 supported by the frame-side link bracket 101A in such a state as to extend along the left-right direction is inserted. This allows the first link member 51 to swing around the first link pin 53.

In the second link member 52, in a state in which one of the three corner parts is rotatably supported by the rear end of the first link member 51, one of the remaining two corner parts is extended upward to be rotatably connected to an arm-side link bracket 4AL provided at the lower part of the swing arm 4 (lower part of the connecting part 4M). Furthermore, the other of the remaining two corner parts is extended forward to be rotatably connected to a lower end part of a rear cushion 60.

For the connection of the second link member 52 with the first link member 51, the arm-side link bracket 4AL, and the rear cushion 60, a second link pin 54, a third link pin 55, and a fourth link pin 56 that extend along the left-right direction similarly to the above-described first link pin 53 and are inserted into the respective corner parts are used. A collar made of a resin and a needle bearing are provided around an outer circumference of each of the first link pin 53, the second link pin 54, the third link pin 55, and the fourth link pin 56 although detailed description thereof is omitted.

As shown in FIG. 2, in certain embodiments, the above-described rear cushion 60 has a substantially cylindrical shape as its outer shape. It extends long along its axial direction and is so provided as to span a space between the link mechanism unit 50 (corner part of the second link member 52 located on the front side) and the center upper cross frame 100.

The rear cushion 60 expands and contracts in its longitudinal direction as the axial direction to generate a damping force against the swing of the swing arm 4. The rear cushion 60 includes a cylinder part 60A having a damper chamber, a spring 60B disposed around an outer circumference of the cylinder part 60A, a rod part 60C protruding from the cylinder part 60A along its axial direction, and a reserve tank 60D that is so provided as to protrude from the cylinder part 60A outward in its radial direction and communicates with the inside of the cylinder part 60A.

The rear cushion 60 extends upward (specifically, toward the front upper side) with a tip part (lower end part) of the rod part 60C connected to the link mechanism unit 50, and an upper end connecting part 60E provided at an upper end part of the cylinder part 60A is connected to a rear cushion support part 100A provided on the center upper cross frame 100. When the swing arm 4 swings, the first link member 51 (often referred to as cushion connecting rod) of the link mechanism unit 50 pushes and pulls the center lower cross frame 101. When the link mechanism unit 50 is provided and the rear cushion 60 is connected to it, the flexibility in the swing of the rear cushion 60 increases and the flexibility in the cushion characteristics of the rear cushion 60 is enhanced. For this reason, the link mechanism unit 50 can be provided.

Referring back to FIG. 5, symbol 20A in this diagram denotes a bracket part formed at a rear part of the crankcase 20 in such a manner as to swell rearward and the engine E is supported by the pivot shaft 4A through insertion of the pivot shaft 4A into the bracket part 20A.

The bracket part 20A has a pair of left and right supported parts 20AL and 20AR that are cast monolithically with the crankcase 20 and protrude rearward from the rear part of the crankcase 20. The pivot shaft 4A is inserted into the respective insertion holes formed in the supported parts 20AL and 20AR with the intermediary of collars 61. Furthermore, the bracket part 20A is connected to the pivot shaft 4A between the left arm part 4L and the right arm part 4R in the swing arm 4.

Figure 7:
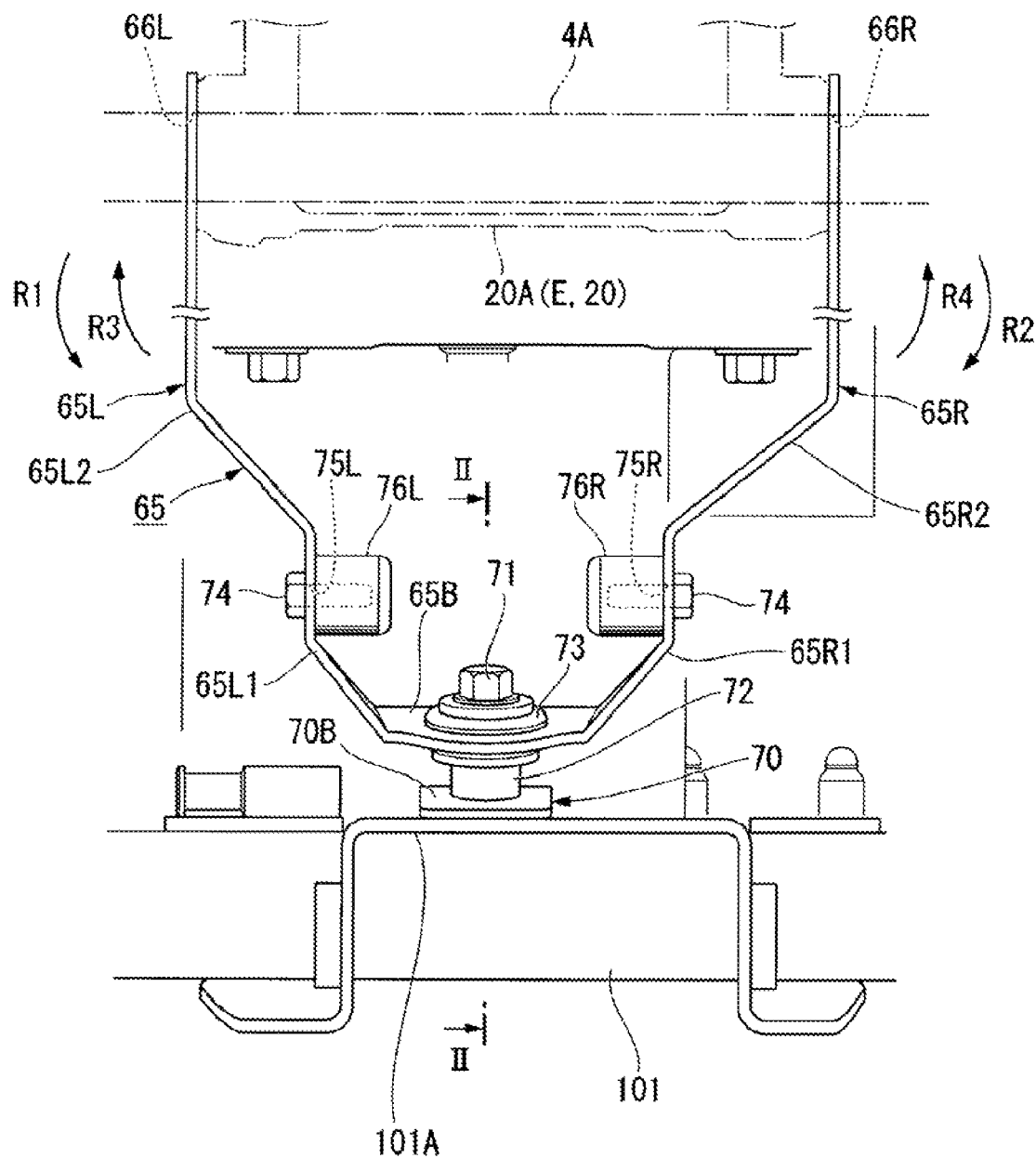
FIG. 7 is a diagram of the hanger member included in the motorcycle as seen from a rear side.

FIG. 7 is a diagram of the periphery of the bracket part 20A as seen from a rear side. Referring to FIGS. 5 and 7, in the motorcycle 1 of certain embodiments, the pivot shaft 4A and the center lower cross frame 101 are connected by a hanger member 65.

The hanger member 65 functions as a reinforcing member of the vehicle body frame 10. In addition, it functions as a load transmitting member that disperses the chain reaction force generated when the engine is driven and the road surface reaction force generated in traveling. In FIG. 5, part of the hanger member 65 is shown by two-dot chain lines for convenience of description.

The hanger member 65 is formed by bending processing of a metal plate that is an elastic body. It is formed into a substantially U-shape having a left extending part 65L, a right extending part 65R, and a bottom part 65B that connects one ends of these left extending part 65L and right extending part 65R, and is so disposed as to be opened upward in front view.

Pivot shaft attaching holes 66L and 66R into which the pivot shaft 4A is inserted are formed at upper end parts of the left extending part 65L and the right extending part 65R, respectively. The left extending part 65L and the right extending part 65R are each connected to the pivot shaft 4A through insertion of the pivot shaft 4A into the left and right pivot shaft attaching holes 66L and 66R between the left arm part 4L and the right arm part 4R in the swing arm 4. This allows an upper side of the hanger member 65 to be connected to the pivot shaft 4A. Furthermore, referring to FIG. 5, one end part of the pivot shaft 4A is made to abut against the boss part 30L from the outside in the vehicle width direction and the other end part is made to penetrate the boss part 30R. In addition, a nut 4B provided at the other end part is in pressure-contact with the boss part 30R from the outside in the vehicle width direction. Therefore, the pivot shaft 4A is so provided as to span a space between the boss parts 30L and 30R and collectively supports the swing arm 4 and the hanger member 65.

Figure 8:
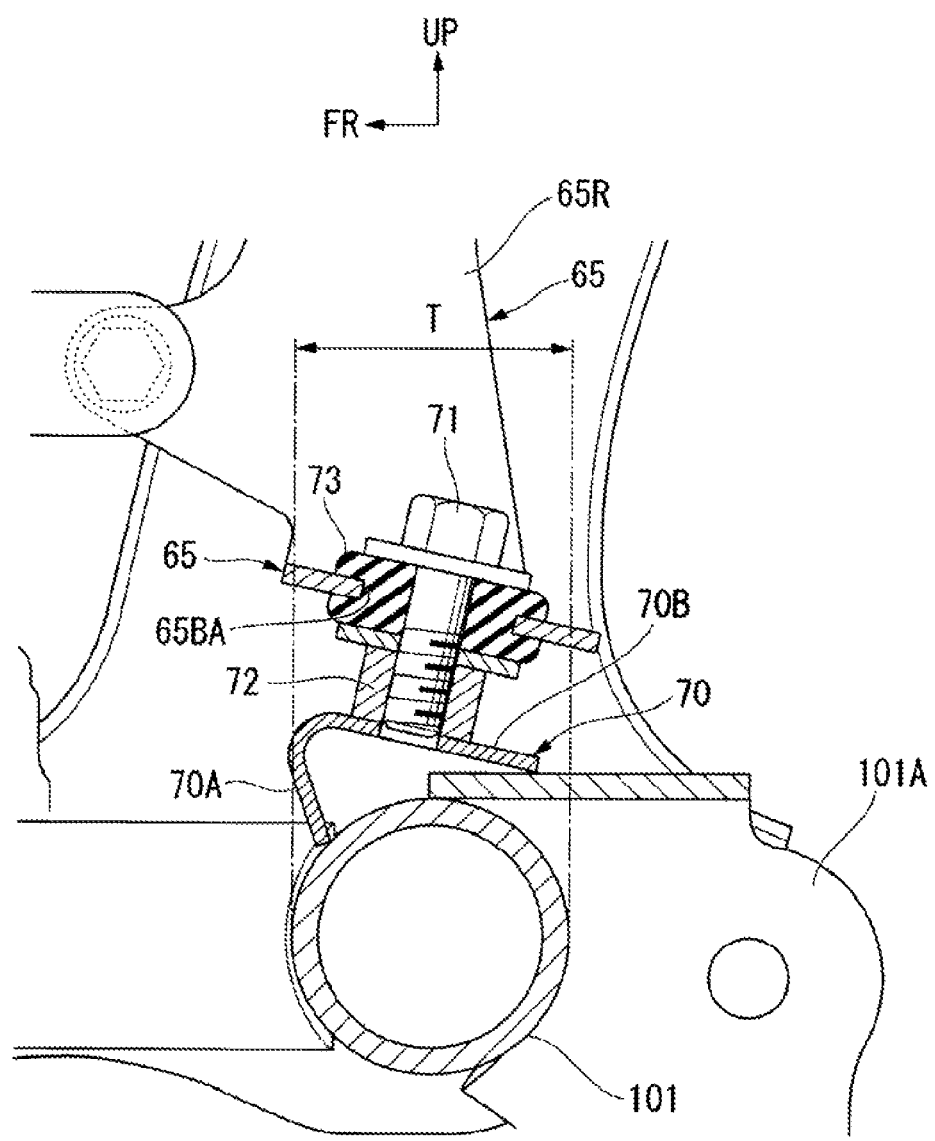
FIG. 8 is a sectional view along line II-II in FIG. 7.

Meanwhile, referring also to FIG. 8, the bottom part 65B of the hanger member 65 is fastened to a fastening part 70 provided at the center part of the center lower cross frame 101 in the vehicle width direction from the upper side toward the lower side by a bolt 71 as a fastening member. In the bottom part 65B, an insertion hole 65BA into which the bolt 71 is inserted is formed. This allows a lower side of the hanger member 65 to be connected to the center lower cross frame 101.

The fastening part 70 is formed into an L-shape in a longitudinal section by bending processing of a metal plate. A tip part of one side part 70A of two side parts forming the L-shape is welded to an upper surface of the center lower cross frame 101 and an other side part 70B is set to such a state as to extend toward a rear lower side above the upper surface of the center lower cross frame 101. A weld nut 72 is provided on an upper surface of the other side part 70B in the fastening part 70 and the bolt 71 is screwed to the weld nut 72. Therefore, the bottom part 65B and the fastening part 70 are connected.

Specifically, a grommet 73 with a circular ring shape as an elastic member such as synthetic rubber is fitted to an inner circumferential part of the insertion hole 65BA and the bolt 71 is made to penetrate the grommet 73. Furthermore, the bolt 71 is fastened to the fastening part 70 in a state in which a head part of the bolt 71 is in pressure-contact with an upper surface of the grommet 73. Therefore, the bottom part 65B is connected to the fastening part 70. This allows the bottom part 65B to be connected to the fastening part 70 in a state in which a certain level of flexibility is ensured about the movement of the bottom part 65B in the radial direction and axial direction of the bolt 71.

In FIG. 8, an area indicated by symbol T shows an upward projection area of the center lower cross frame 101 when the center lower cross frame 101 is projected in the upward vertical direction. As is apparent from reference to this area T, in certain embodiments, the bottom part 65B is disposed at a position overlapping with the center lower cross frame 101 in the upward-downward direction and is fastened to the center lower cross frame 101 with the intermediary of the fastening part 70.

Furthermore, as shown in FIG. 2, the hanger member 65 completely overlaps with the pivot plates 13L and 13R in side view.

With reference to FIG. 7, the shapes of the left extending part 65L and the right extending part 65R in the hanger member 65 will be described in detail. The left extending part 65L and the right extending part 65R are each formed into a shape extending outward in the vehicle width direction from the bottom part 65B toward the upper side.

Specifically, the left extending part 65L has a left first extending part 65L1 and a left second extending part 65L2. The left first extending part 65L1 extends outward in the vehicle width direction from the bottom part 65B toward the upper side and then extends straight along the upward-downward direction. The left second extending part 65L2 extends outward in the vehicle width direction from an upper end of the left first extending part 65L1 toward the upper side and then extends straight along the upward-downward direction. The right extending part 65R is symmetric with the left extending part 65L in the left-right direction and has a right first extending part 65R1 and a right second extending part 65R2.

An interval between the left first extending part 65L1 and the right first extending part 65R1 in the vehicle width direction is smaller than an interval between the left second extending part 65L2 and the right second extending part 65R2 in the vehicle width direction.

Insertion holes 75L and 75R for two bolts 74 that are fastening members fastened to the crankcase 20 from the left and right sides can be formed in the left first extending part 65L1 and the right first extending part 65R1, respectively. The bolts 74 inserted into the respective insertion holes 75L and 75R are fastened to a pair of left and right fastening parts 76L and 76R formed at the rear part of the crankcase 20. This restricts the rotation of the hanger member 65 around the pivot shaft 4A.

The pivot shaft attaching holes 66L and 66R described above are formed in the left second extending part 65L2 and the right second extending part 65R2. Therefore, in certain embodiments, an interval between the above-described left and right insertion holes 75L and 75R is different from an interval between the left and right pivot shaft attaching holes 66L and 66R and the left and right insertion holes 75L and 75R are located inside the left and right pivot shaft attaching holes 66L and 66R in the vehicle width direction.

In the motorcycle 1 of the embodiments described above, the engine E is supported by the pivot shaft 4A through insertion of the pivot shaft 4A into the bracket part 20A provided at the rear part of the engine E. The center lower cross frame 101 is so provided as to span a space between parts in the left and right pivot plates 13L and 13R on the lower side relative to the pivot shaft 4A. The pivot shaft 4A and the center lower cross frame 101 are connected by the hanger member 65.

Due to this, in the motorcycle 1, due to the connection of the pivot shaft 4A and the center lower cross frame 101 by the hanger member 65, when the vehicle body frame 10 is about to bend in a roll direction, the hanger member 65 generates a restoring force in the opposite direction to the direction in which the vehicle body frame 10 is about to bend and thus the hanger member 65 functions as a reinforcing member. Due to this, the rigidity of the vehicle body frame 10 in the roll direction is ensured. However, the vehicle body frame 10 is deformed in the roll direction more easily compared with the case in which the engine E is fastened directly to the center lower cross frame 101. This ensures the vehicle control performance with ensuring of adequate rigidity of the vehicle body frame 10.

Specifically, referring to FIG. 7, a rotation arrow R1 in this diagram indicates a direction in the case of attempting to make the vehicle body frame 10 bend toward the anticlockwise side in the plane of the drawing paper in the roll direction and a rotation arrow R2 indicates a direction in the case of attempting to make the vehicle body frame 10 bend toward the clockwise side in the plane of the drawing paper in the roll direction.

When the vehicle body frame 10 is about to bend in the direction R1, the hanger member 65 generates a restoring force in the clockwise direction in the plane of the drawing paper as the direction of a rotation arrow indicated by R3. When the vehicle body frame 10 is about to bend in the direction R2, the hanger member 65 generates a restoring force in the anticlockwise direction in the plane of the drawing paper as the direction of a rotation arrow indicated by R4.

Thus, the hanger member 65 functions as a reinforcing member of the vehicle body frame 10 and therefore the rigidity in the roll direction is ensured in the vehicle body frame 10. However, the vehicle body frame 10 is deformed in the roll direction more easily compared with the case in which the engine E is fastened directly to the center lower cross frame 101 and so forth.

Furthermore, in certain embodiments of the motorcycle 1, the chain reaction force generated when the engine is driven and the road surface reaction force generated in traveling are transmitted from the pivot shaft 4A and the center lower cross frame 101 to the vehicle body frame 10 via the hanger member 65 in a dispersed manner.

Due to this, in the motorcycle 1, the vehicle control performance is ensured with ensuring of adequate rigidity of the vehicle body frame 10 and the chain reaction force generated when the engine is driven and the road surface reaction force generated in traveling can be efficiently transmitted to the vehicle body frame.

Figure 9:
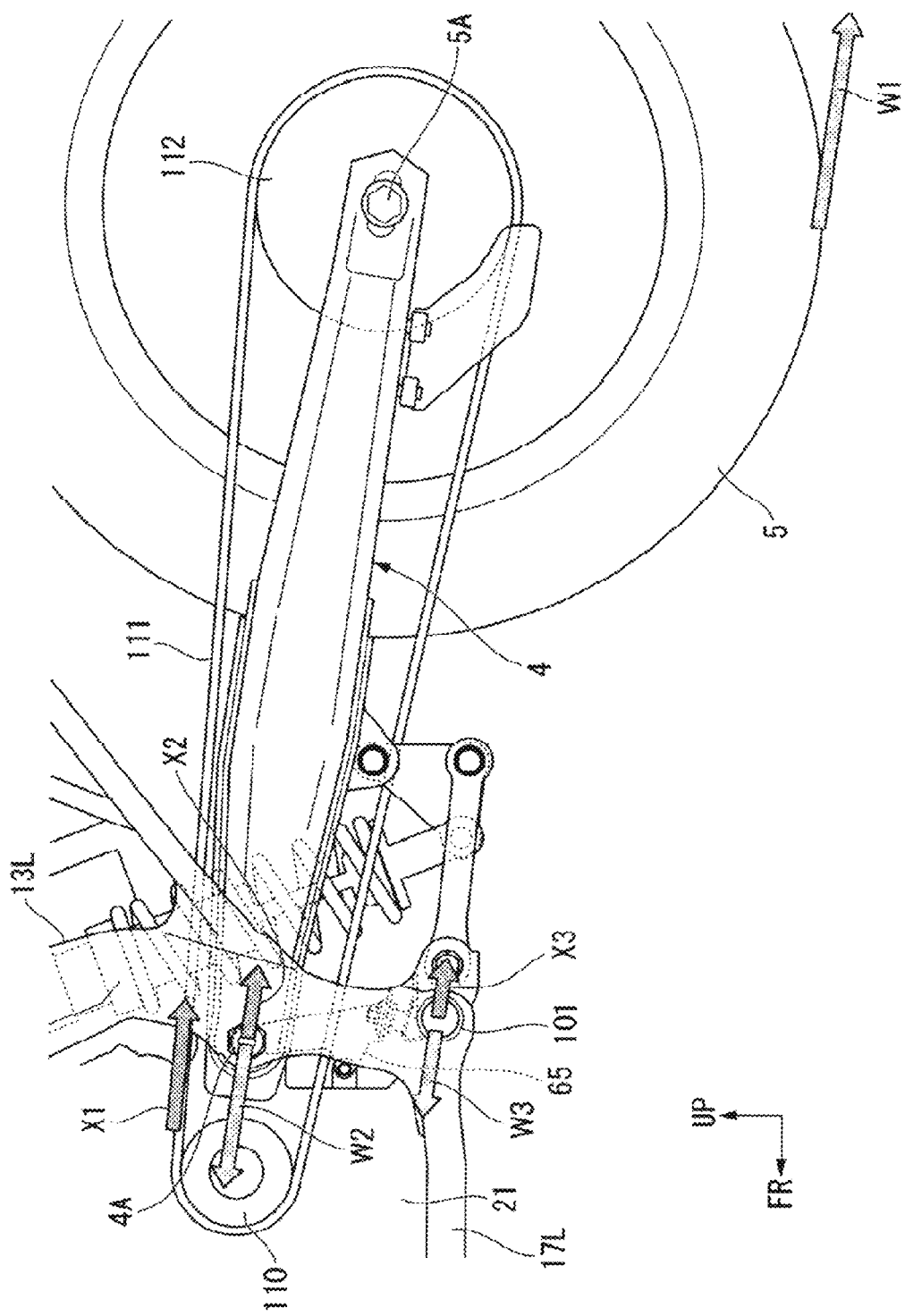
FIG. 9 is a diagram for explaining how an engine driving force and a chain reaction force of a drive chain when an engine is driven are transmitted in the motorcycle.

Specifically, referring to FIG. 9, an arrow X1 in this diagram indicates a chain reaction force (chain tension). When the engine E is driven and the drive sprocket 110 is driven, the drive chain 111 is pulled forward. Due to this, the chain reaction force X1 that pulls the engine E rearward is generated in the drive chain 111.

In embodiments of the motorcycle 1, the chain reaction force X1 can be transmitted to the vehicle body frame 10 in such a manner as to be dispersed into a dispersed load X2 transmitted from the pivot shaft 4A to the center parts of the pivot plates 13L and 13R in the upward-downward direction and a dispersed load X3 transmitted from a lower end of the hanger member 65 to the center lower cross frame 101. Due to this, in the motorcycle 1, the chain reaction force X1 can be efficiently transmitted to the vehicle body frame 10 because the chain reaction force X1 is not locally applied to the vehicle body frame 10 but dispersed into two points.

Figure 10:
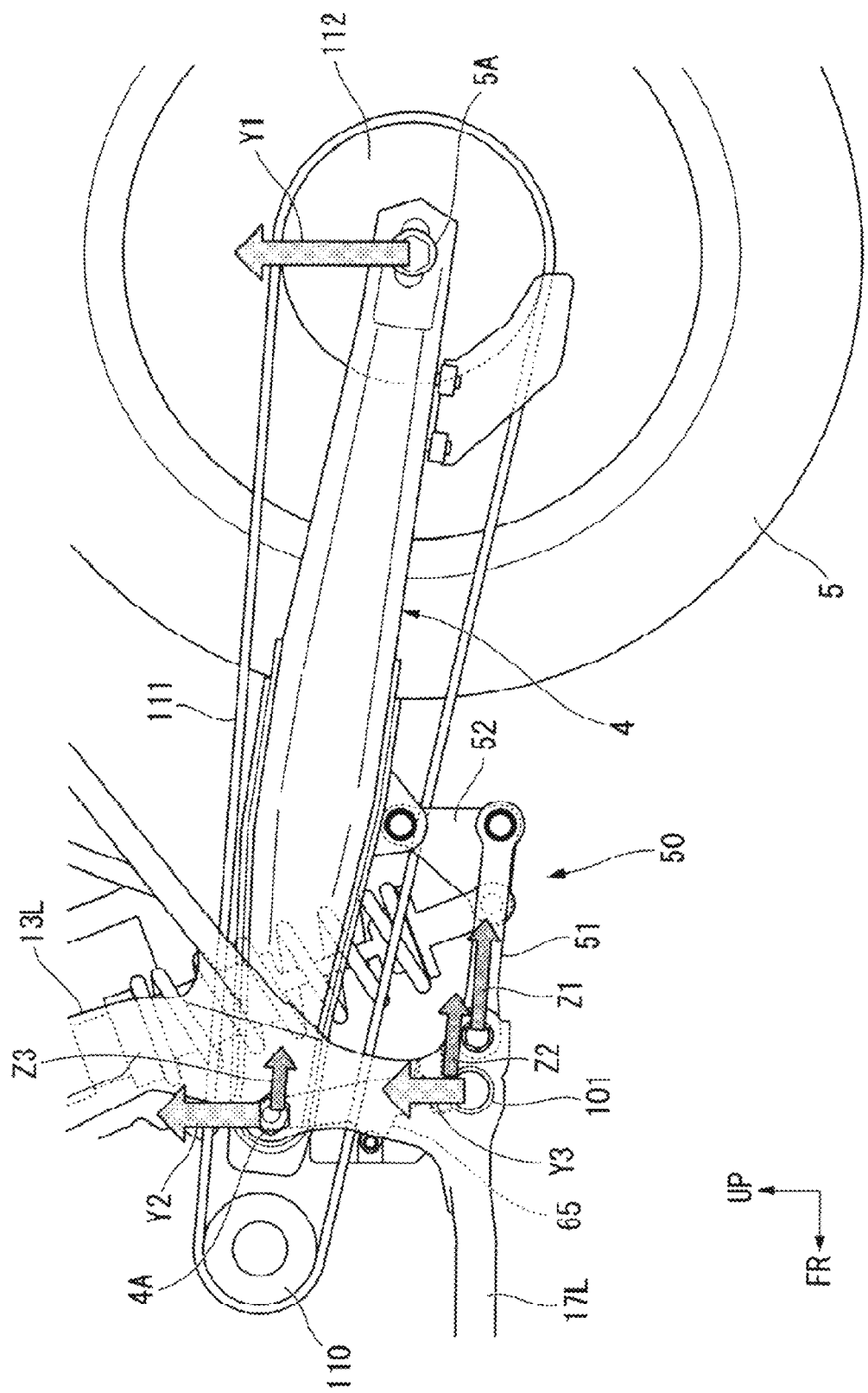
FIG. 10 is a diagram for explaining how a road surface reaction force from a rear wheel is transmitted in the motorcycle.

Furthermore, referring to FIG. 10, an arrow Y1 in this diagram indicates an upward road surface reaction force that is generated in traveling and is received by the rear wheel 5. In addition, an arrow Z1 indicates a tensile force of pulling of the center lower cross frame 101 via the frame-side link bracket 101A due to the upward swing of the respective link members 51 and 52 of the link mechanism unit 50 when the above-described road surface reaction force Y1 is generated and the swing arm 4 swings.

In examples of the motorcycle 1, the road surface reaction force Y1 can be transmitted to the vehicle body frame 10 in such a manner as to be dispersed into a dispersed load Y2 transmitted from the pivot shaft 4A to the center parts of the pivot plates 13L and 13R in the upward-downward direction and a dispersed load Y3 transmitted from the lower end of the hanger member 65 to the center lower cross frame 101.

Moreover, in the motorcycle 1, the tensile force Z1 can be transmitted to the vehicle body frame 10 in such a manner as to be dispersed into a dispersed load Z2 transmitted to the center lower cross frame 101 and a dispersed load Z3 transmitted from the upper end of the hanger member 65 to the center parts of the pivot plates 13L and 13R in the upward-downward direction via the pivot shaft 4A.

Due to this, in the motorcycle 1, the road surface reaction force can be efficiently transmitted to the vehicle body frame 10 because the road surface reaction force Y1 and the tensile force Z1 generated due to the road surface reaction force Y1 are not locally applied to the vehicle body frame 10 but each dispersed into two points.

Furthermore, in examples of the motorcycle 1, the engine driving force is transmitted from the pivot shaft 4A and the center lower cross frame 101 toward the front side. Thus, the engine driving force can be transmitted from the side of the vehicle body lower part to the vehicle body side. Therefore, it is also possible to efficiently transmit the engine driving force to the vehicle body side.

Specifically, referring to FIG. 9, an arrow W1 in this diagram indicates an engine driving force transmitted from the rear wheel 5 to the traveling surface when the engine is driven. The motorcycle 1 moves forward by receiving the reaction force of the engine driving force W1.

In examples of the motorcycle 1, the reaction force of the engine driving force W1 can be transmitted to the vehicle body frame 10 in such a manner as to be dispersed into a dispersed driving reaction force W2 transmitted from the pivot shaft 4A to the center parts of the pivot plates 13L and 13R in the upward-downward direction and a dispersed driving reaction force W3 transmitted from the lower end of the hanger member 65 to the center lower cross frame 101. Due to this, in the motorcycle 1, the engine driving force can be transmitted from the side of the vehicle body lower part to the vehicle body side and therefore can be efficiently transmitted to the vehicle body side.

Other effects besides the effects described above are as follows. In examples of the motorcycle 1, the hanger member 65 is formed into a substantially U-shape having the left extending part 65L, the right extending part 65R, and the bottom part 65B that connects one ends of these left extending part 65L and right extending part 65R, and is so disposed as to be opened upward in front view. The pivot shaft attaching holes 66L and 66R into which the pivot shaft 4A is inserted are formed at the upper end parts of the left extending part 65L and the right extending part 65R, respectively. The left extending part 65L and the right extending part 65R are connected to the pivot shaft 4A through insertion of the pivot shaft 4A into the pivot shaft attaching holes 66L and 66R between the left arm part 4L and the right arm part 4R.

Due to this, the swing arm 4 and the hanger member 65 can be collectively supported by the pivot shaft 4A and thus the hanger member 65 can be provided without increasing the number of parts. Furthermore, because the hanger member 65 is formed into a substantially U-shape and is connected to the pivot shaft 4A in such a state as to be opened upward in front view, a load in the upward-downward direction transmitted to the hanger member 65 can be dispersed and absorbed at the left and right parts. In addition, the hanger member 65 gives rigidity in the roll direction by the left and right parts evenly and therefore the vehicle control performance can be favorably ensured.

Furthermore, in certain embodiments of the motorcycle 1, the bottom part 65B in the hanger member 65 is fastened to the fastening part 70 provided at the center part of the center lower cross frame 101 in the vehicle width direction from the upper side toward the lower side by the bolt 71 as a fastening member.

Due to this, the bottom part 65B of the hanger member 65 is fastened to the fastening part 70 at one point located at the center part of the center lower cross frame 101 in the vehicle width direction from the upper side toward the lower side by the bolt 71. This facilitates assembling of the hanger member 65.

In addition, in certain embodiments of the motorcycle 1, the bottom part 65B of the hanger member 65 is disposed at a position overlapping with the center lower cross frame 101 in the upward-downward direction and is fastened to the fastening part 70 with the intermediary of the grommet 73 as an elastic member.

The fastening of the bottom part 65B to the center lower cross frame 101 with the intermediary of the grommet 73 allows the vehicle body frame 10 to be adequately bent in the roll direction. Thus, the vehicle control performance can be favorably ensured.

Furthermore, because the bottom part 65B is so disposed as to overlap with the center lower cross frame 101 in the upward-downward direction, a load can be efficiently transmitted from the bottom part 65B to the center lower cross frame 101 and the rigidity against external forces (input load) such as the chain reaction force can be favorably ensured.

Moreover, in certain embodiments of the motorcycle 1, the insertion holes 75L and 75R for the bolts 74 as fastening members fastened to the crankcase of the engine E are formed along the left-right direction in the left first extending part 65L1 and the right first extending part 65R1 each located at an intermediate part between the upper end part and the lower end part of the left extending part 65L and the right extending part 65R, respectively. The bolts 74 inserted into the insertion holes 75L and 75R are fastened to the crankcase 20. This restricts the rotation of the hanger member 65 around the pivot shaft 4A.

This allows stable transmission of a load from the hanger member 65 to the center lower cross frame 101.

Furthermore, in certain embodiments of the motorcycle 1, the interval between the left and right insertion holes 75L and 75R of the left first extending part 65L1 and the right first extending part 65R1 in the left extending part 65L and the right extending part 65R is different from the interval between the left and right pivot shaft attaching holes 66L and 66R, and the left and right insertion holes 75L and 75R are located inside the left and right pivot shaft attaching holes 66L and 66R in the vehicle width direction.

Due to this, for example if a rear part shape of the engine E is tapered toward the lower side, the hanger member 65 can be provided with a compact size with suppression of outward extension thereof in the vehicle width direction.

In addition, in certain embodiments of the motorcycle 1, the hanger member 65 completely overlaps with the pivot plates 13L and 13R in side view.

Due to this, the hanger member 65 is hidden by the pivot plates 13L and 13R in side view, which can make the appearance favorable.

In certain embodiments, the pivot shaft 4A and the center lower cross frame 101 are disposed at positions overlapping with each other in the upward-downward direction.

Due to this, the hanger member 65 extends straight or substantially straight along the upward-downward direction and thus is not parallel to the traveling surface. Furthermore, an engine load can be supported by the pivot shaft 4A and the center lower cross frame 101 in a dispersed manner, which can suppress the concentration of the load on the pivot shaft 4A.

Although certain embodiments of the present invention are described above, the present invention is not limited to above-described embodiment and various changes can be applied without departing from the gist of the present invention.

For example, in the above-described embodiments, the present invention is applied to a motorcycle as a saddle-type vehicle. However, the saddle-type vehicle defined in the present invention is a concept including overall vehicles ridden astride the vehicle body and is a concept including not only motorcycles but also three-wheeled and four-wheeled vehicles. Therefore, this invention can be applied to not only motorcycles but also three-wheeled and four-wheeled vehicles.

In the above-described embodiments, the motorcycle 1 of a chain-driven system is described as examples of the saddle-type vehicle. However, the saddle-type vehicle defined in the present invention may be a vehicle of a shaft-driven system.

DESCRIPTION OF REFERENCE SYMBOLS

1 Motorcycle (saddle-type vehicle)
4 Swing arm
4A Pivot shaft
4L Left arm part
4R Right arm part
5 Rear wheel
10 Vehicle body frame
11 Head pipe
12L, 12R Main frame
13L, 13R Pivot plate
17L, 17R Lower frame
20 Crankcase
20A Bracket part
65 Hanger member
65B Bottom part
65L Left extending part
65R Right extending part
66L, 66R Pivot shaft attaching hole
70 Fastening part
71 Bolt (fastening member)
73 Grommet (elastic member)
74 Bolt (fastening member)
75L, 75R Insertion hole
101 Center lower cross frame
110 Drive sprocket (transmitting gear)
111 Drive chain
112 Driven sprocket (transmitting gear)
E Engine

The invention claimed is:

1. A saddle vehicle, comprising:
a vehicle body frame including left and right main frames extending rearward from a head pipe, left and right pivot plates extending downward from rear parts of the left and right main frames, and left and right lower frames that extend along a front-rear direction at a lower part of the vehicle and each having a rear end part connected to a respective one of the left and right pivot plates;
a swing arm supported swingably around a pivot shaft that is so provided as to span a space between the left and right pivot plates;
a rear wheel supported by the swing arm; and
an engine supported by the vehicle body frame,
wherein the engine is supported by the pivot shaft through insertion of the pivot shaft into a bracket part provided at a rear part of the engine,
a cross frame is so provided as to span a space between parts in the left and right pivot plates on a lower side relative to the pivot shaft or between rear parts of the left and right lower frames,
wherein the pivot shaft and the cross frame are connected by a hanger member,
wherein the swing arm includes a left arm part connected to the pivot shaft on a left side relative to center in a vehicle width direction and a right arm part connected to the pivot shaft on a right side relative to the center in the vehicle width direction,
wherein the bracket part is connected to the pivot shaft between the left arm part and the right arm part, and wherein the hanger member is connected to the pivot shaft between the left arm part and the right arm part.

2. The saddle vehicle according to claim 1,
wherein the hanger member is formed into a substantially U-shape having a left extending part, a right extending part, and a bottom part that connects one end part of the left extending part and one end part of the right extending part, and is so disposed as to be opened upward in front view,
pivot shaft attaching holes into which the pivot shaft is inserted are formed at upper end parts of the left extending part and the right extending part, and
wherein the left extending part and the right extending part are connected to the pivot shaft through insertion of the pivot shaft into the pivot shaft attaching holes between the left arm part and the right arm part.

3. The saddle vehicle according to claim 2,
wherein the bottom part is fastened to a fastening part provided at a center part of the cross frame in the vehicle width direction from an upper side toward the lower side by a fastening member.

4. The saddle vehicle according to claim 3,
wherein the bottom part is disposed at a position overlapping with the cross frame in an upward-downward direction and is fastened to the fastening part with an intermediary of an elastic member.

5. The saddle vehicle according to claim 2,
wherein insertion holes for fastening members fastened to the engine are each formed at an intermediate part between an upper end part and a lower end part of a respective one of the left extending part and the right extending part, and
wherein rotation of the hanger member around the pivot shaft is restricted by fastening of the fastening members inserted into the insertion holes to the engine.

6. The saddle vehicle according to claim 5,
wherein interval between the insertion holes on left and right sides is different from an interval between the pivot shaft attaching holes on the left and right sides, and the insertion holes on the left and right sides are located inside the pivot shaft attaching holes on the left and right sides in the vehicle width direction.

7. The saddle vehicle according to claim 1,
wherein the pivot shaft and the cross frame are disposed at positions overlapping with each other in an upward-downward direction.

8. The saddle vehicle according to claim 1, further comprising:
a drive chain that is wound around a transmitting gear of the engine and a transmitting gear of the rear wheel, and is configured to transmit a driving force of the engine to the rear wheel.

9. The saddle vehicle according to claim 1, further comprising:
a link mechanism unit that is configured to span a space between the swing arm and the cross frame,
wherein the link mechanism unit and the vehicle body frame are connected by a rear cushion.

10. A saddle vehicle, comprising:
a vehicle body frame including left and right main frames extending rearward from a head pipe, left and right pivot plates extending downward from rear parts of the left and right main frames, and left and right lower frames that extend along a front-rear direction at a lower part of the vehicle and each having a rear end part connected to a respective one of the left and right pivot plates;

a swing arm supported swingably around a pivot shaft that is so provided as to span a space between the left and right pivot plates;

a rear wheel supported by the swing arm; and an engine supported by the vehicle body frame, wherein the engine is supported by the pivot shaft through insertion of the pivot shaft into a bracket part provided at a rear part of the engine, a cross frame is so provided as to span a space between parts in the left and right pivot plates on a lower side relative to the pivot shaft or between rear parts of the left and right lower frames, wherein the pivot shaft and the cross frame are connected by a hanger member, and wherein the hanger member completely overlaps with the pivot plates in side view.

11. A saddle vehicle, comprising:

body frame means for supporting vehicle components thereupon, said body frame means including left and right main frame means extending rearward from head pipe means, left and right pivot plate means extending downward from rear parts of the main frame means, and left and right lower frame means extending along a front-rear direction at a lower part of the vehicle, and each having a rear end part connected to a respective one of the left and right pivot plate means;

swing arm means swingably supported around a pivot shaft provided as to span a space between the left and right pivot plate means;

rear wheel means for supporting the vehicle, said rear wheel means supported by the swing arm means; and engine means for providing motive power, said engine means being supported by the body frame means, wherein the engine means is supported by the pivot shaft through insertion of the pivot shaft into a bracket part provided at a rear part of the engine means, cross frame means are provided for spanning a space between parts in the left and right pivot plate means on a lower side relative to the pivot shaft or between rear parts of the left and right lower frame means, wherein the pivot shaft and the cross frame means are connected by a hanger means, wherein the swing arm means includes a left arm connected to the pivot shaft on a left side relative to center in a vehicle width direction and a right arm part connected to the pivot shaft on a right side relative to the center in the vehicle width direction, the bracket part is connected to the pivot shaft between the left arm part and the right arm part, and wherein the hanger means is connected to the pivot shaft between the left arm part and the right arm part.

12. The saddle vehicle according to claim 11, wherein the hanger means is formed into a substantially U-shape having a left extending part and a right extending part, and a bottom part for connecting one end part of the left extending part and one end part of the right extending part, and is so disposed as to be opened upward in front view, wherein pivot shaft attaching holes into which the pivot shaft is inserted are formed at upper end parts of the left extending part and the right extending part, and wherein the left extending part and the right extending part are connected to the pivot shaft through insertion of the pivot shaft into the pivot shaft attaching holes between the left arm part and the right arm part.

13. The saddle vehicle according to claim 12, wherein the bottom part is fastened to a fastening part provided at a center part of the cross frame means in the vehicle width direction from an upper side toward the lower side by a fastening means.

14. The saddle vehicle according to claim 13, wherein the bottom part is disposed at a position overlapping with the cross frame means in an upward-downward direction and is fastened to the fastening part with an intermediary of an elastic means.

15. The saddle vehicle according to claim 12, wherein insertion holes for fastening means fastened to the engine means are formed at an intermediate part between an upper end part and a lower end part of a respective one of the left extending part and the right extending part, and wherein rotation of the hanger means around the pivot shaft is restricted by fastening one of the fastening means inserted into the insertion holes to the engine means.

16. The saddle vehicle according to claim 15, wherein an interval between the insertion holes on left and right sides is different from an interval between the pivot shaft attaching holes on the left and right sides, and the insertion holes on the left and right sides are located inside the pivot shaft attaching holes on the left and right sides in the vehicle width direction.

17. The saddle vehicle according to claim 11, wherein the hanger means completely overlaps with the pivot plate means in a side view.

18. The saddle vehicle according to claim 11, wherein the pivot shaft and the cross frame means are disposed at positions overlapping with each other in an upward-downward direction.

* * * * *